(12) United States Patent
Wilkens et al.

(10) Patent No.: US 11,261,601 B2
(45) Date of Patent: Mar. 1, 2022

(54) CROSS RUNNER CONNECTOR AND CROSS RUNNER CONNECTOR ARRANGEMENT FOR A SUSPENDED CEILING SYSTEM

(71) Applicant: SAINT-GOBAIN ECOPHON AB, Hyllinge (SE)

(72) Inventors: Jan Wilkens, Höganäs (SE); Thomas Nilsson, Helsingborg (SE)

(73) Assignee: SAINT-GOBAIN ECOPHON AB, Hyllinge (SE)

( * ) Notice: Subject to any disclaimer, the term of this patent is extended or adjusted under 35 U.S.C. 154(b) by 491 days.

(21) Appl. No.: 16/303,450

(22) PCT Filed: May 15, 2017

(86) PCT No.: PCT/EP2017/061615
§ 371 (c)(1),
(2) Date: Nov. 20, 2018

(87) PCT Pub. No.: WO2017/198619
PCT Pub. Date: Nov. 23, 2017

(65) Prior Publication Data
US 2020/0318350 A1 Oct. 8, 2020

(30) Foreign Application Priority Data

May 20, 2016 (EP) .................................... 16170633

(51) Int. Cl.
*E04B 9/12* (2006.01)
*E04B 9/06* (2006.01)
*E04B 9/30* (2006.01)

(52) U.S. Cl.
CPC .............. *E04B 9/122* (2013.01); *E04B 9/127* (2013.01); *E04B 9/068* (2013.01); *E04B 9/30* (2013.01); *F16B 2200/20* (2018.08)

(58) Field of Classification Search
CPC .......... E04B 9/122; E04B 9/068; E04B 9/127; Y10T 403/447
See application file for complete search history.

(56) References Cited

U.S. PATENT DOCUMENTS 3,367,695 A * 2/1968 Haertel ................... E04B 9/122
403/219
3,396,997 A 8/1968 Adams
(Continued)

OTHER PUBLICATIONS

International Search Report from International Application No. PCT/EP2017/061615 dated Jun. 8, 2017.

*Primary Examiner* — Babajide A Demuren
*Assistant Examiner* — Daniel J Kenny
(74) *Attorney, Agent, or Firm* — Brundidge & Stanger, P.C.

(57) ABSTRACT

A cross runner connector for a suspended ceiling system (1) comprising a main runner (10) being provided with an opening (11) for reception of the cross runner connector and having a circumference defining an opening notch (12); and a cross runner (30), the cross runner connector comprising a guiding lip (41) and a locking lip (42) separated by a slit (43) and extending in the longitudinal direction (P2) of the cross runner connector, the guiding lip (41) having a guide edge portion (44) provided with a guide lip notch (45) and a distal guide tip (46) being offset in a first lateral direction (P3) such that the cross runner connector is laterally displaceable in the first lateral direction (P3) in response to insertion of the cross runner connector into the opening (11) of the main runner (10) with the guide edge portion (44) positioned in the opening notch (12) of the opening (11), and the locking lip (42) having a locking protrusion (48) protruding in the first lateral direction (P3). The invention further relates to a cross runner connector arrangement comprising the cross runner connector and a main runner.

11 Claims, 8 Drawing Sheets

(56) References Cited

U.S. PATENT DOCUMENTS

| | | | |
|---|---|---|---|
| 3,675,957 A | 7/1972 | Paul | |
| 3,606,417 A | 9/1974 | Rousey | |
| 4,264,231 A | 4/1981 | Rosenbaum | |
| 5,893,249 A * | 4/1999 | Peterson | E04B 9/122 |
| | | | 52/506.07 |
| 6,199,343 B1 * | 3/2001 | Sauer | E04B 9/068 |
| | | | 403/347 |
| 8,584,418 B2 * | 11/2013 | Underkofler | E04B 9/122 |
| | | | 52/506.05 |

* cited by examiner

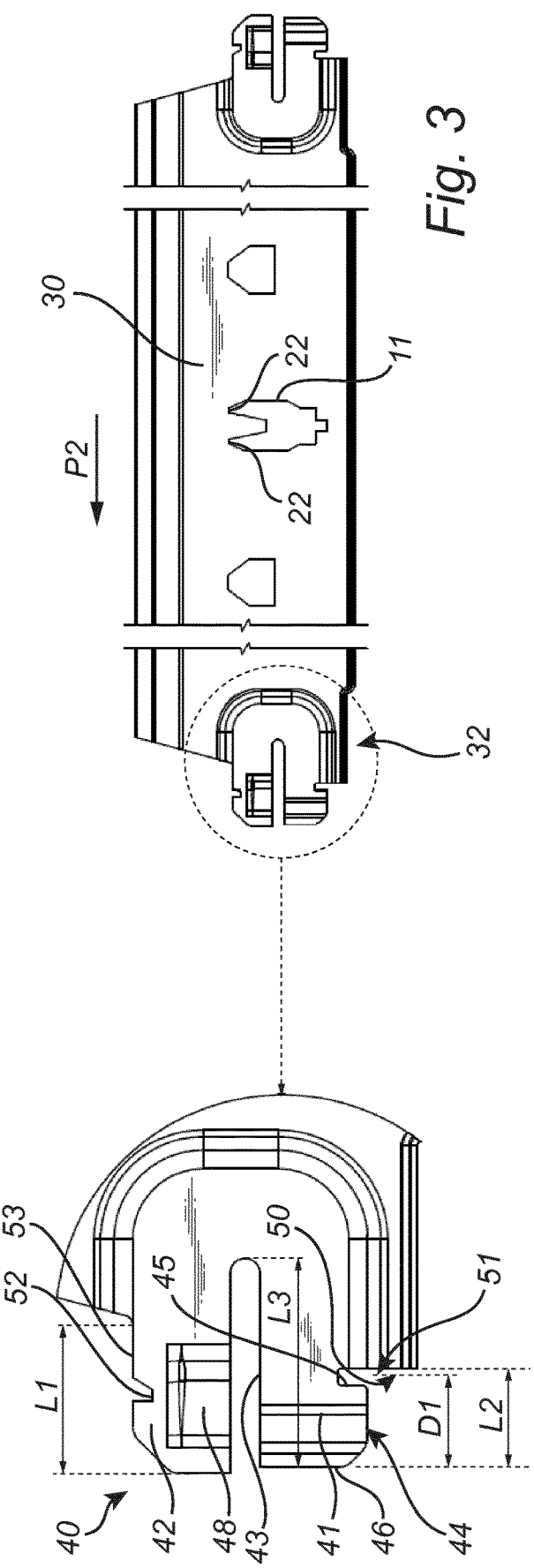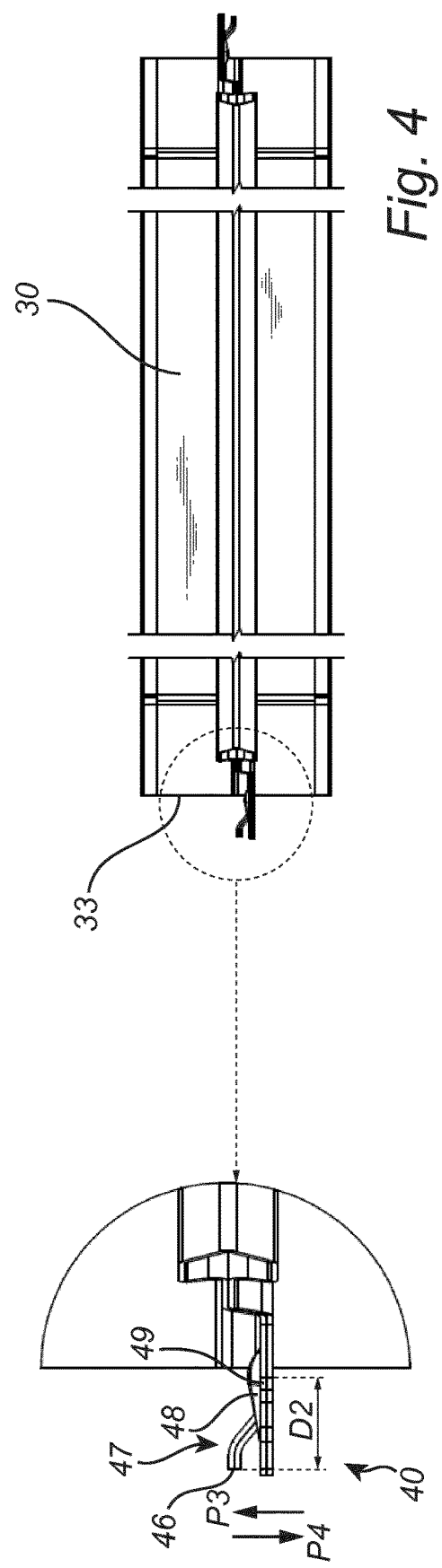

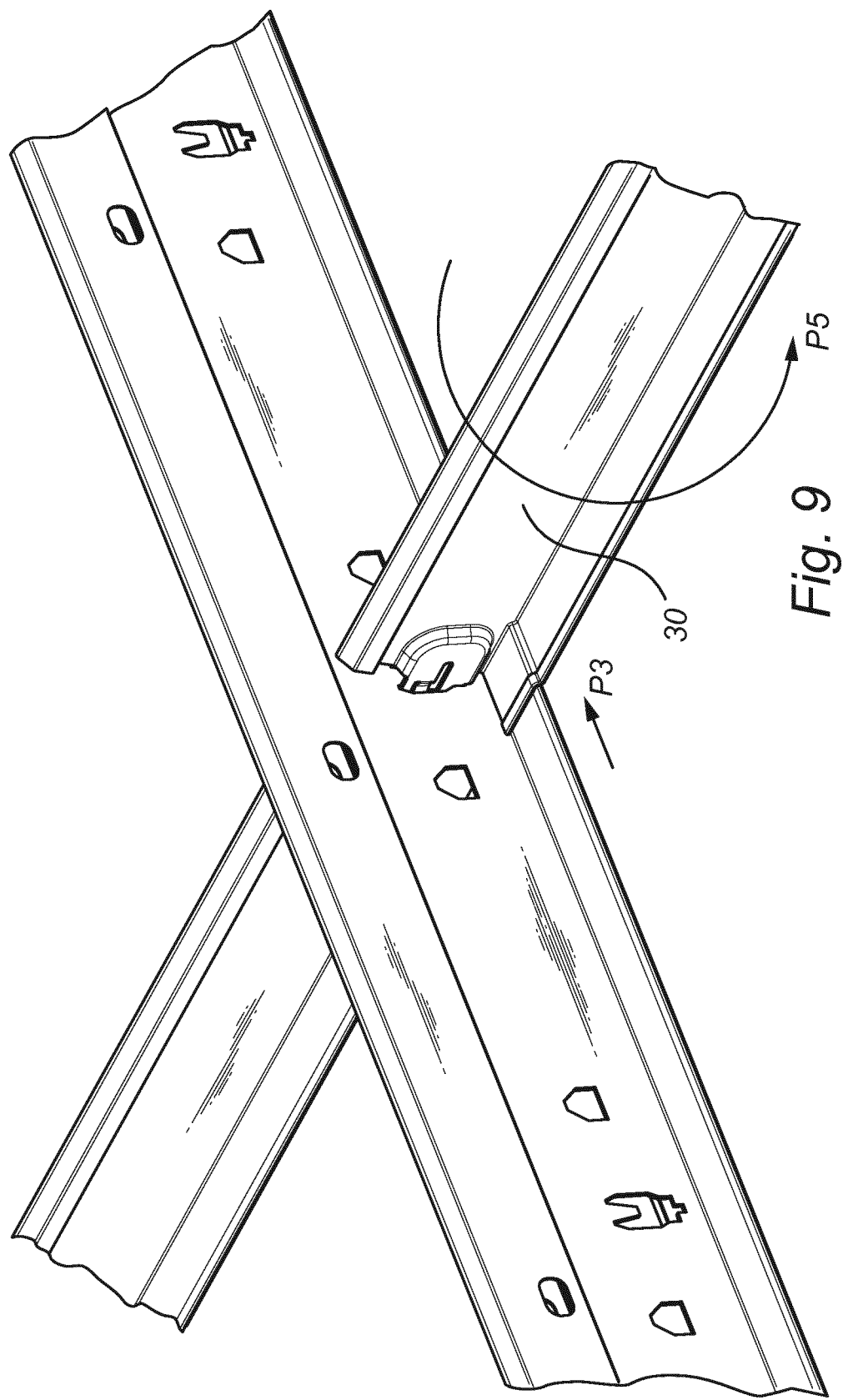

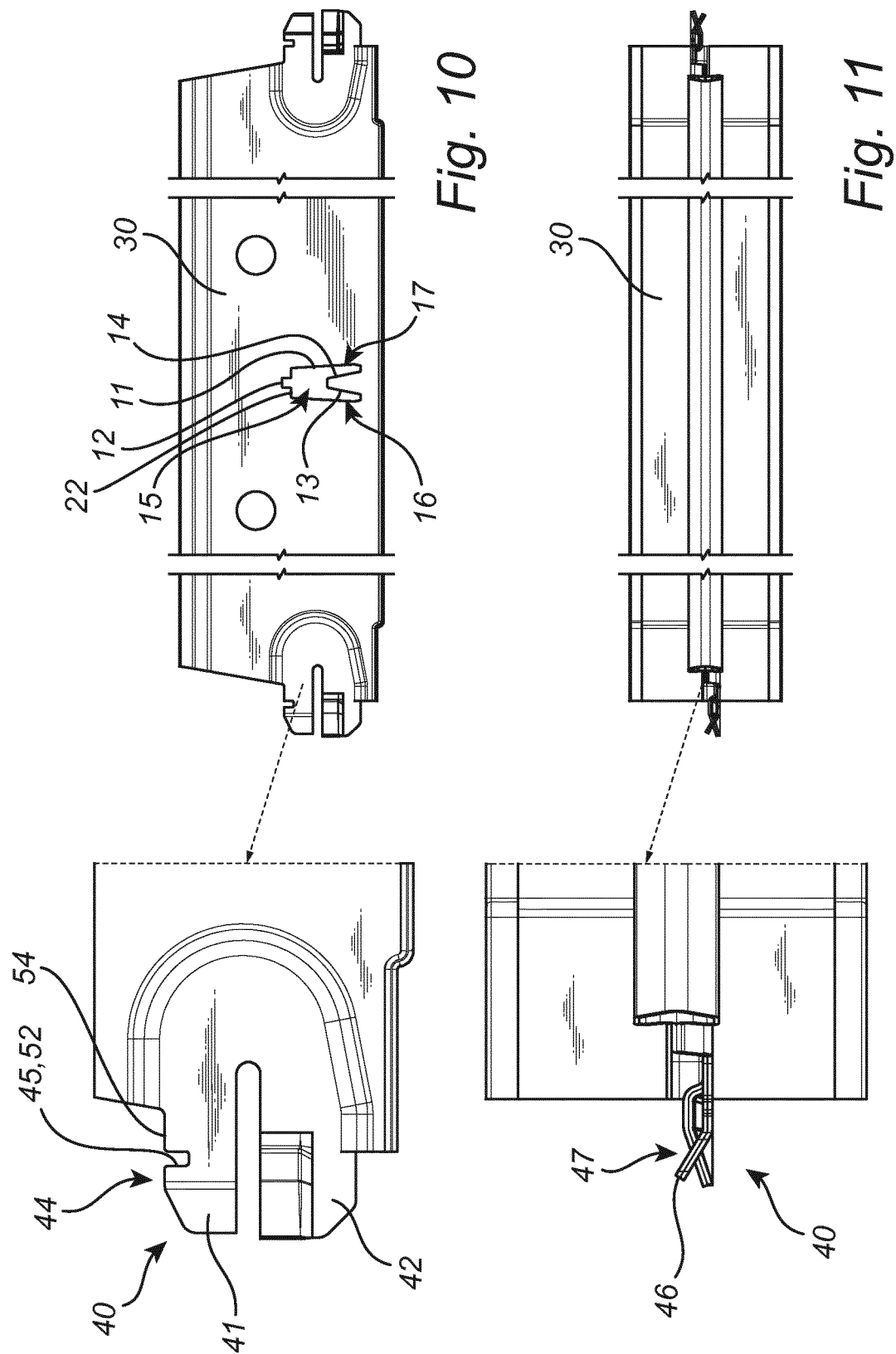

CROSS RUNNER CONNECTOR AND CROSS RUNNER CONNECTOR ARRANGEMENT FOR A SUSPENDED CEILING SYSTEM

FIELD OF THE INVENTION

The present invention relates to cross runner connector for a suspended ceiling system, and more specifically to such a cross runner connector for a suspended ceiling comprising a main runner and a cross runner; and a cross runner connector arrangement for a suspended ceiling system.

BACKGROUND ART

A suspended ceiling system in a room or in another accommodation may serve a variety of purposes. One purpose of having a suspended ceiling system may be to conceal an underside of a space, such as another room, which is located above the room. Another purpose may be to provide improved noise absorption and/or noise attenuation in and outside of the room. The resulting plenum space located between the suspended ceiling and a main ceiling of the room may further be utilized to accommodate e.g. wiring, piping, as well as devices related to heating, ventilation and air condition.

Typically, the suspended ceiling consists of a plurality of ceiling tiles which are fitted into a supporting grid of profiles which is mounted in the main ceiling.

The grid of profiles typically comprises main runners and cross runners connected thereto at right angles.

Cross runner connectors may be used in order to connect the cross runners to the main runners included in the grid of profiles.

The cross runner connector is associated with the cross runner, and for connection of the cross runner to the main runner, the cross runner connector is inserted into an opening provided in the main runner.

The cross runner connector usually comprises a plurality of lips or tongues which resiliently engage the edges of the opening during the connection operation in order to provide a reliable connection.

Various types of cross runner connectors are known from for instance U.S. Pat. Nos. 3,675,957, 3,396,997, 5,893,249, 2,846,031.

The cross runner connector must provide a reliable locking of the cross runner connected to the main runner. Further, the cross runner should ensure correct positioning of the cross runner in relation to the main runner and also enable disconnection of the cross runner. Also, it should be possible to provide the cross runner connector at a reasonable cost.

It has proven to be difficult to provide a cross runner connector fulfilling all requirements imposed thereon. A cross runner connector providing a reliable locking might be hard to disconnect and vice versa. Further, a cross runner connector ensuring correct positioning of the cross runner in relation to the main runner, might involve high manufacturing costs.

SUMMARY OF THE INVENTION

In view of the above, the object of the present invention is to provide an improved cross runner connector arrangement.

A further object is to provide such a cross runner connector arrangement which ensures reliable locking of the cross runner to the main runner.

Another object is to provide such a cross runner connector arrangement which ensures correct positioning of the cross runner connector in relation to the main runner.

It is also an object to provide a cost effective cross runner connector arrangement.

To achieve at least one of the above objects and also other objects that will be evident from the following description, a cross runner connector having the features defined in claim 1, and a cross runner connector arrangement according to claim 10 are provided according to the present invention. Preferred embodiments will be evident from the dependent claims.

More specifically, there is provided according to the present invention a a cross runner connector for a suspended ceiling system comprising a main runner being provided with an opening for reception of the cross runner connector and having a circumference defining an opening notch; and a cross runner, the cross runner connector comprising a guiding lip and a locking lip separated by a slit and extending in the longitudinal direction of the cross runner connector, the guiding lip having a guide edge portion provided with a guide lip notch and a distal guide tip being offset in a first lateral direction such that the cross runner connector is laterally displaceable in the first lateral direction in response to insertion of the cross runner connector into the opening of the main runner with the guide edge portion positioned in the opening notch of the opening, and the locking lip having a locking protrusion protruding in the first lateral direction.

Hereby an improved cross runner connector is provided. The guiding lip comprises a guiding edge portion provided with a guide lip notch. Thus, the cross runner connector may cooperate with the opening provided in the main runner wherein the guiding edge portion may be arranged to be positioned in the opening notch of the opening during connection of the cross runner connector to the main runner. When the cross runner is fully inserted into the opening of the main runner, the guide lip notch may be aligned with the opening notch such that the cross runner connector may be laterally displaced. Hence, a reliable locking of the cross runner connector in the desired locking position in the longitudinal direction may be ensured.

An end portion of the guiding lip may thus be curved or angled in order for the distal guide tip to become offset in the first lateral direction. Since the distal guide tip of the guiding lip is being offset in the first lateral direction, the cross runner connector may be caused to be laterally displaced during initial insertion of the cross runner connector into the opening of the main runner with the guiding edge portion positioned in the opening notch. As a consequence, the locking lip and its protrusion may be made to engage an engagement surface of the opening of the main runner causing the locking lip and/or the guiding lip to flex. When the cross runner connector is fully inserted, and the guide lip notch in aligned with the opening notch, the locking lip and/or the guiding lip may be allowed to flex back displacing the cross runner connector in the opposite lateral direction. The flexing back may manifest itself as a snap or a click providing feedback that a reliable connection has been achieved.

The cross runner connector is connectable to the main runner by cooperation with the opening provided in the main runner. Thus, the connection is not dependent of a second cross runner connector being inserted into the opening from the opposite side. Hence, the cross runner connector is not dependent on interlocking with the second cross runner connector, and thus the inventive cross runner connector does not suffer the drawback of accumulation of dimensional errors along the extension of several successive cross runners caused by cross runner connectors interlocking with each other.

The inventive cross runner connector comprises in its simplest form only two lips, i.e. the guiding lip and the locking lip. Thus, the total height of the cross runner connector may be minimized.

The inventive design of the cross runner connector allows for disconnection of a cross runner by means of twisting. By twisting of the cross runner connector, the guide lip notch may be laterally displaced such that it becomes aligned with the opening notch, allowing subsequent retraction of the cross runner connector out of the opening of the main runner. As a consequence, the longitudinal extension of the locking lip and the guiding lip may be minimized since there is no need for provision of space for pressing the locking lip by for instance finger manipulation in order to allow disconnection, which in turn enables improved utilization of material. Alternatively, disconnection may be accomplished by means of manipulation of the lips in a conventional manner.

It is realized that an additional cross runner provided with an inventive cross runner connector may be connected to a cross runner already connected to a main runner. The cross runner connected to the main runner will in such a case correspond to a main runner relative to the additional cross runner.

In accordance with an embodiment, the locking lip may have a length L1 which is greater than a length L2 of the guiding lip. Hereby it may be ensured that it will be the locking lip that is made to flex in response to the engagement of the locking lip and the opening of the main runner during insertion of the cross runner connector into the opening.

The guiding lip and the locking lip may be designed such that it is the guiding lip and/or the locking lip which flexes in response to the engagement between the locking lip and the opening. The proneness of the guiding lip and/or the locking lip for flexing may be for instance be controlled by suitable choice of length, thickness or height of the respective lip or by provision of suitable designed reinforcements or weakenings.

According to another embodiment, one of the guiding lip and the locking lip may comprise an upper safety notch provided in a top edge of the associated lip. By means of provision of a safety notch, a cross runner associated with the cross runner connector may be prevented from falling down during connection or disconnection if the operation is stopped when the cross runner connector is only partly inserted into or retracted out of the opening of the main runner.

According to yet another embodiment, the cross runner connector may be formed integral with a cross runner of the suspended ceiling system. Alternatively, the cross runner connector may be formed as a separate member attached by suitable means to the associated cross runner.

The cross runner connector may be associated with a cross runner of the ceiling system having an inverted T-shape.

According to yet another embodiment, the slit may have a length L3 exceeding a length L1 of the guiding lip and exceeding a length L2 of the locking lip. Hereby it may be ensured that the desired flexing of the locking lip and/or the guiding lip is not hampered by the slit.

According to yet another embodiment, the guide lip notch may be arranged at a distance D1, in the longitudinal direction of the cross runner connector, from the distal guide tip and the locking protrusion may have a crest arranged at a distance D2, in the longitudinal direction of the cross runner connector, from the distal guide tip, wherein the distance D1 may be greater than the distance D2. Hereby, it may be ensured that the crest of the locking protrusion has passed the opening once the cross runner connector is fully inserted and the guide lip notch is aligned with the opening notch, which may further ensure a reliable connection of the cross runner.

According to yet another embodiment, the cross runner connector may further comprise an insertion stop for defining a locking position in the longitudinal direction. Hereby a correct connection may be ensured. The guiding lip and/or the locking lip may be made to cooperate with the opening of the main runner in order to determine the locking position in lateral direction as well in vertical direction. The insertion stop may be formed by the guide lip notch and/or by other means.

According to yet another embodiment, the insertion stop and the guide lip notch may be arranged at a distance D1, in the longitudinal direction of the cross runner connector, from the distal guide tip. Hereby it may be ensured that the guide lip notch is aligned with the opening notch once the cross runner connector is fully inserted into the opening of the main runner.

A main runner for a suspended ceiling system comprising said main runner and cross runners, may be provided with an opening having a circumference defining an opening notch and a first and a second engagement edge, wherein the first engagement edge may be arranged for engagement with a cross runner connector associated with a cross runner being connectable to the main runner from a first lateral side thereof and wherein the second engagement edge may be arranged for engagement with a cross runner connector associated with a cross runner being connectable to the main runner from a second lateral side thereof opposite to said first lateral side.

The provision of an opening notch in the circumference of the opening allows for cooperation with a guide edge portion of a cross runner connector during insertion thereof into the opening, and thus the insertion may be performed in a controlled manner.

The provision of a first and a second engagement edge ensures that a first cross runner connector may be connected the main runner while cooperating with the first engagement edge and that a second cross runner connector may be connected to the main runner from an opposite side while cooperating with the second engagement edge. The connection or the first and second cross runner connector may thus be performed independent of each other.

The opening may comprise a base portion and a first and a second leg portion, the base portion comprising an edge extending in the longitudinal direction of the main runner, wherein the opening notch is provided in the edge, and the first engagement edge being associated with the first leg portion and the second engagement edge being associated with the second leg portion.

The opening may be provided in a web portion of the main runner.

The main runner may have an inverted T-shape.

According to a second aspect of the present invention, a cross runner connector arrangement for a suspended ceiling system is provided comprising a main runner and a cross runner, the cross runner connector arrangement comprising a cross runner connector as previously described and a main runner as previously described. The cross runner connector is associated with the cross runner and insertable into the opening of the main runner with the guide edge portion positioned in the opening notch for connection of the cross runner to the main runner.

According to an embodiment, the locking lip may be arranged to engage with one of the first and second engagement edge of the opening in response to an initial insertion of the cross runner connector into the opening of the main runner, wherein the locking lip is arranged to flex in a second lateral direction opposite to the first lateral direction in response to a further insertion of the cross runner connector into the opening, and/or wherein the guiding lip is arranged to flex in the second lateral direction in response the further insertion of the cross runner connector into the opening.

The details and advantages of the second aspect of the invention are largely analogous to those of the first aspect of the invention, wherein reference is made to the above.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 3 is a side view of a cross runner connector and an associated cross runner.

FIG. 4 is top view of the cross runner connector and the associated cross runner of FIG. 3.

FIG. 9 is a perspective view illustrating a step of disconnecting a cross runner from the main runner.

FIG. 10 is a side view of an alternative embodiment of a cross runner connector and associated cross runner.

FIG. 11 is a top view of the alternative embodiment of FIG. 10.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
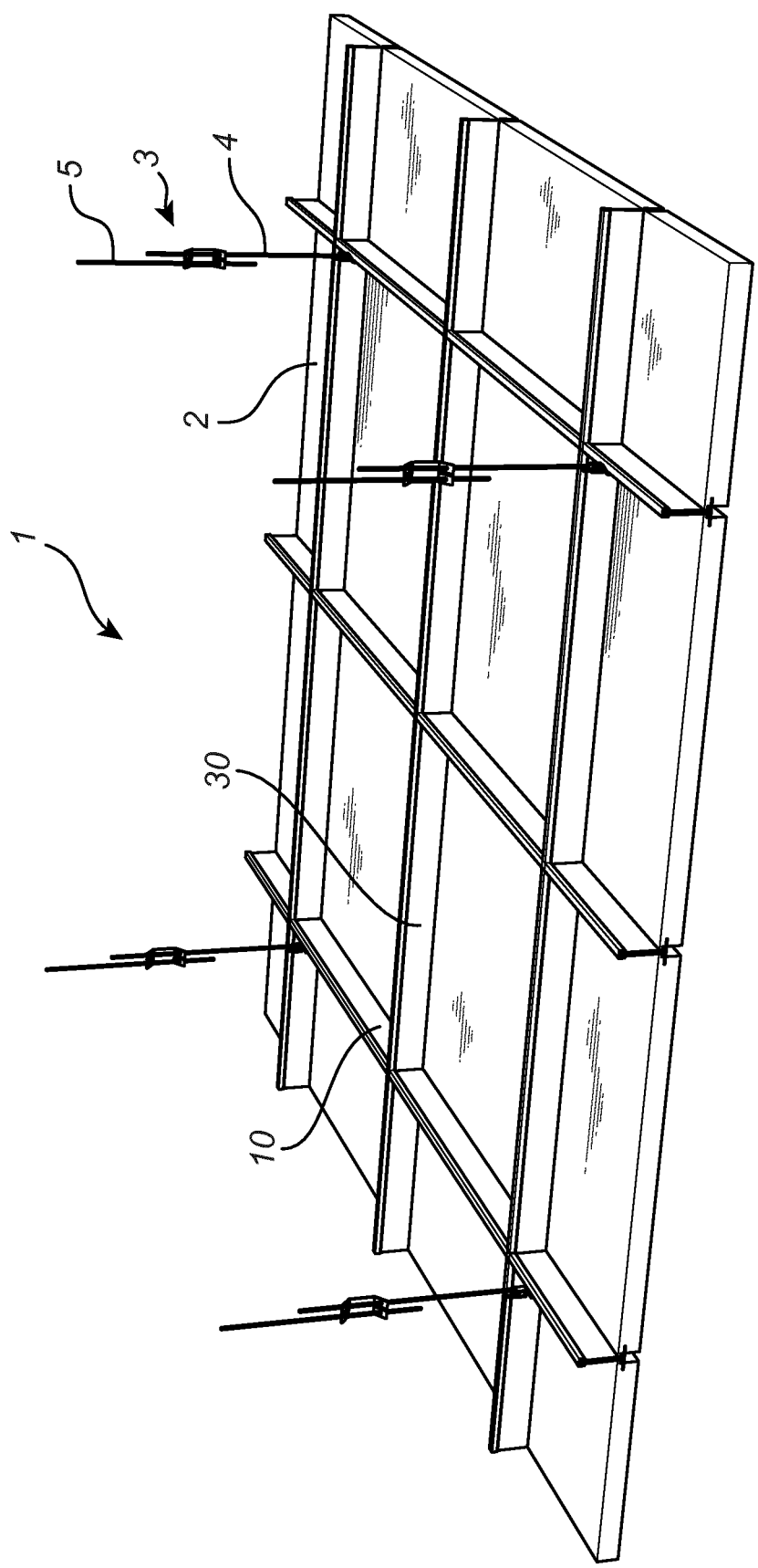
FIG. 1 is a perspective view of a suspended ceiling.

FIG. 1 is a schematic perspective view illustrating a suspended ceiling 1 comprising a plurality of ceiling tiles 2 and a grid of profiles, as seen obliquely from above. The suspended ceiling 1 is adapted to be mounted underneath a main ceiling of a room or another accommodation, thereby forming a two-dimensional visible ceiling surface as seen from below. When mounted, the grid of profiles comprised in the suspended ceiling 1 may be at least partly concealed.

The grid of profiles is a supporting structure for the ceiling tiles and comprises profiles in the form of main 10 runners as well as cross runners 30. Some of the main runners 10 may be suspended in the main ceiling, thereby supporting the grid of profiles, while others of the main runners 10 may be non-supported in the same. The cross runners 30 are provided at right angles to the main runners 10 and are connected to the same at a discrete set of locations by means of inventive cross runner connections which will be described in detail below. Thereby, the main runners 10 and the cross runners 30 form a grid-like structure which is adapted to support ceiling tiles 2 of a rectangular shape. Optionally, the grid of profiles may also comprise wall runners as is well-known to a person skilled in the art. It is also understood that the overall geometry of the profiles may vary. For instance, the profiles may be curved, horizontally and/or vertically, and may consequently be adapted to support ceiling tiles of other shapes. For example, a ceiling tile may be in the shape of a polygon, such as a triangle, a quadrilateral or a pentagon, etc.

According to the shown embodiment, the grid of profiles forms frames in the shape of inner rectangular frames and outer rectangular frame portions into which the ceiling tiles and are to be inserted, respectively. Thus, each ceiling tile is at least partly enclosed by profiles.

The grid of profiles is suspended by hangers 3 such as hanger wires, rods, etc. In FIG. 1, each hanger 3 comprises a first and a second hanger element 4, 5 which are arranged in parallel. An end portion of each of the first hanger elements 4 is provided with a hook and is inserted into a corresponding hole in a hanger clip which is provided in a main runner 10. Moreover, the length of each hanger 3 is adjustable by means of an arrangement which allows for a relative lengthwise displacement of the first and second hanger element 4, 5. The second hanger elements 5 are fastened to a permanent structure of the room, such as the main ceiling of the room (not shown), thereby upholding the suspended ceiling 1.

According to the present embodiment, each of the profiles is an inverted T-profile, or a tee, thereby having a cross-section in the form of an inverted T. Thus, each of the profiles has a central web and two flanges which protrude to an equal extent from a lower part of the web in two opposite horizontal directions. The flanges are adapted to support the ceiling tiles 2. Optionally, the central web may comprise a bulb, e.g. for reinforcing the T-profile. The profiles are comprised of a light-weight material. For example, the material may be a metal such as steel or a sheet metal. Alternatively, the material may be a rigid plastic, a light metal, such as aluminum, or similarly. The profiles according to the present embodiment are rigid. However, it is equally conceivable to utilize resilient profiles which may simplify the installation of the ceiling tiles.

According to an alternative embodiment, the profiles may comprise at least one of an L-profile, an H-profile, an I-profile and a Z-profile.

According to the present embodiment, the ceiling tiles 2 are rectangular comprising four sides, wherein each side is adapted to engage with a profile. Alternatively, the ceiling tiles may have other shapes. As mentioned above, the ceiling tile may for example be in the shape of a polygon, such as a triangle, a quadrilateral or a pentagon, etc.

In order to improve the acoustical environment of the room, each of the ceiling tiles 2 may comprise a material which is sufficiently acoustically absorbing and/or acoustically insulating for the room under consideration. In addition, the materials are preferably chosen to be relatively lightweight, thereby giving rise to a lightweight ceiling. Moreover, the material of the ceiling tiles is preferably an elastically deformable material. For example, the ceiling tiles may be made of a compressed fibre material comprising mineral wool such as rock wool, or especially glass wool.

The lateral dimensions of each ceiling tile substantially correspond to the lateral dimensions of the inner or outer frame into which it is to be inserted. More specifically, the lateral dimensions of each ceiling tile substantially correspond to the dimensions a frame formed by the upwardly directed web portions of the T-profiles surrounding the ceiling tile under consideration. Furthermore, the thickness of each ceiling tile is preferably smaller than a height of the upwardly directed web portions of the surrounding T-profiles, although a different thickness is equally conceivable.

Figure 2:
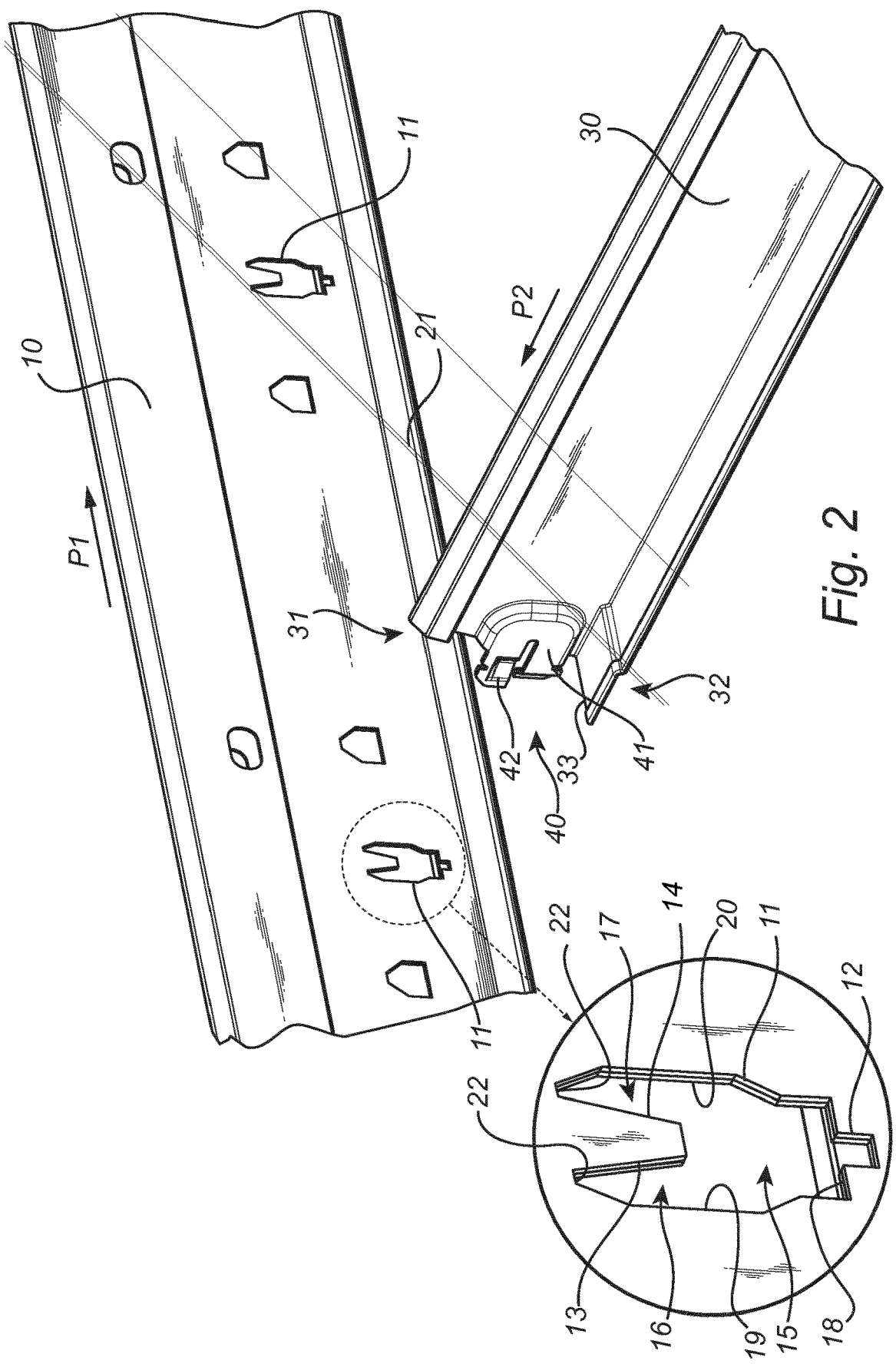
FIG. 2 is a perspective view of a cross runner connector arrangement for connection of a cross runner to a main runner.

As mentioned above, the cross runners 30 are provided at right angles to the main runners 10 and are connected to the same at a discrete set of locations. More specifically, each cross runner 30 is connected to a main runner 10 by means of a cross runner connector arrangement, which is shown in FIG. 2, to which reference now is made.

The cross runner connector arrangement comprises a cross runner connector 40 associated with a cross runner 30 and an opening 11 in a main runner 10. The cross runner 30 and the main runner 10 are formed of T-profiles. The cross runner connector 40 is arranged at an end portion 31 of the associated cross runner 30. As illustrated, the main runner 10 may be provided with several openings 11 arranged at discrete locations distributed along the extension of the main runner 10.

The cross runner connector 40 is insertable into the opening 11 of the main runner 10, and the cross runner arrangement is such arranged that the cross runner 30 is releasable connected to the main runner 10.

The opening 11 of the main runner 10 is such arranged that a first cross runner connector 40 is insertable into the opening 11 from a first lateral side of the main runner 10 and a second cross runner connector (not shown) in insertable into the opening 11 from a second lateral side, opposite to the first lateral side of the main runner 10. Thus, two cross runner connectors and associated cross runners may be connected to the main runner 10 from opposing lateral sides at the same discrete location of the main runner 10.

The cross runner connector arrangement is arranged such that the two cross runners attached to the main runner 10 from opposite sides at the same discrete location do not interlock, i.e. each cross runner is connected to the main runner 10 but is not connected to the other cross runner.

The opening 11 of the cross runner arrangement is, as mentioned above, provided in the main runner 10. In the shown embodiment, the opening 11 is provided in the web of the T-profile forming the main runner 10.

The opening 11 has a circumference defining an opening notch 12 and a first and a second engagement edge 13, 14, wherein the first engagement edge 13 is arranged for engagement with the cross runner connector 40 associated with the cross runner 30 being connectable to the main runner 10 from the first lateral side thereof and wherein the second engagement edge 14 is arranged for engagement with a cross runner connector associated with a cross runner being connectable to the main runner 10 from the second lateral side thereof opposite to said first lateral side.

The opening 11, which is shown more in detail in the detached enlargement of FIG. 2, comprises a base portion 15 and a two leg portions 16, 17 extending from the base portion 15. In the shown embodiment, the base portion 15 comprises a bottom edge 18 extending in the longitudinal direction of the main runner indicated by arrow P1, wherein the opening notch 12 is provided in the bottom edge 18 at a central location. The two leg portions 16, 17 extend in an upward direction from the base portion 15, and the first engagement edge 13 is associated with the first leg portion 16 and the second engagement edge 14 is associated with the second leg portion 17.

The cross runner connector 40 is in the shown embodiment integrally formed with the cross runner 30 associated thereto and comprises a guiding lip 41 and a locking lip 42.

The cross runner connector 40 and the cross runner 30 associated thereto is shown more in detail in FIGS. 3 and 4, to which reference now also is made. The cross runner is in accordance with the shown embodiment provided with at least one opening 11 making it possible to connect a not shown additional cross runner at right angle to the cross runner 30, wherein the cross runner 30 in such a case would represent to a main runner in view of the additional cross runner.

In the shown embodiment, the locking lip 42 has a length L1 which is greater than a length L2 of the guiding lip 41.

The guiding lip 41 and the locking lip 42 are separated by a slit 43 extending in the longitudinal direction indicated by arrow P2 of the cross runner connector 40 and the cross runner 30.

In the shown embodiment, a length L3 of the slit 43 exceeds the length L1 of the locking lip 42 and the length L2 of the guiding lip 41.

The guiding lip 41 has a guide edge portion 44 and is provided with a guide lip notch 45 and a distal guide tip 46 which is offset in a first lateral direction indicated by arrow P3. The guide edge portion 44 extends between the distal guide tip and the guide lip notch.

In the shown embodiment, the guide edge portion 44 is formed by the lower edge part of the guiding lip 41, and the guide lip notch 45 is provided in the lower edge part. The guide lip notch 45 is arranged at a distance D1, in the longitudinal direction P2 of the cross runner connector 40, from the distal guide tip 46.

In the shown embodiment, the guiding lip 41 comprises an end portion 47 which is curved such that the distal guide tip 46 of the guiding lip 41 becomes offset in the first lateral direction P3. The offset of the distal guide tip may be achieved by other means, for instance by the end portion being angled.

The locking lip 42 has a locking protrusion 48 protruding in the first lateral direction P3. In the shown embodiment, the locking protrusion 48 is formed as a depression in the locking lip 48. The locking protrusion 48 has a crest 49 arranged at a distance D2, in the longitudinal direction P2 of the cross runner connector 30, from the distal guide tip 46.

The distance D1 at which the guide lip notch 45 is arranged from the distal guide tip 46 may be greater than the distance D2 at which the crest 49 of the locking protrusion 48 is arranged from the distal guide tip 46. Alternatively, the distance D1 may be equal or lesser than the distance D2.

The cross runner connector 40 further comprises an insertion stop 50 for defining a locking position in the longitudinal direction P2 of the cross runner connector 40.

In the shown embodiment, the insertion stop 50 is formed by a vertical edge portion 51 of the web of the cross runner 30, and the guide lip notch 45 is partly defined by the vertical edge portion 51. It is understood that the lower part of the vertical edge portion 51 may be omitted, i.e. the insertion stop 50 may be solely formed by the part of the vertical edge portion defining the guide lip notch 45. Hence, the guide lip notch 45 may act by itself as the insertion stop 50.

The inventive cross runner connector 30 may further comprise an upper safety notch 52. In the shown embodiment, the safety notch 52 is provided in a top edge 53 of the locking lip 42.

For the connection of the cross runner 30 to the main runner 10, the cross runner connector 40 associated with the cross runner 10 is inserted into the opening 11 of the main runner 10 with the guide edge portion 44 of the guiding lip 41 positioned in the opening notch 12 of the opening 11.

As described above, the guiding lip 41 comprises an end portion 47 which is curved such that the distal guide tip 46 of the guiding lip 41 becomes offset in the first lateral direction P3. Consequently, as the cross runner connector 40 is initially inserted into the opening 11 with the guide edge portion 44 positioned in the opening notch 12, the cross runner connector 40 and the associated cross runner 30 will be displaced in the first lateral direction P3. This displacement of the cross runner connector 40 will bring the locking protrusion 48 of locking lip 42 into engagement with the first engagement edge 13 of the circumference defining the opening 11 in the main runner 10.

Upon further insertion of the cross runner connector 40 into the opening 11, the locking lip 42 may be arranged to flex in a second lateral direction indicated by arrow P4, opposite to the first lateral direction P3, in response to the engagement with the first engagement edge 13. In addition, or alternatively, the guiding lip 41 may be arranged to flex in the second lateral direction P4 in response to the further insertion of the cross runner connector 40.

When the cross runner connector 40 is fully inserted into the opening 11, i.e. when the insertion stop 50, which in the shown embodiment is formed by the vertical edge portion 51, abuts the web of the main runner 10 thereby defining the locking position in the longitudinal direction P2 of the cross runner connector 40, the guide lip notch 45 is aligned with the opening notch 12 of the opening 11 and the guide edge portion 44 will thus no longer occupy the opening notch 12. As result, the cross runner connector 40 is free to slide over the bottom edge 18 of the opening 11 in the second lateral direction P4 in response to the engagement between the locking protrusion 48 and the first engagement edge 13. With other words, when the guide lip notch 45 is aligned with the opening notch 12, the locking lip 42 and/or guiding lip 41 are allowed to flex back such that the cross runner 30 is displaced in the second lateral direction P4. The flexing back of the locking lip 42 and/or the guiding lip 41 may manifest itself as a snap or a click providing feedback that a reliable connection has been achieved.

When the cross runner connector 40 slides in the second lateral direction P4, the bottom edge 18 of the opening 11 is thus received in the guide lip notch 45 thereby fixing the locking position of the cross runner 30 in the longitudinal direction P2 thereof.

As described above, the locking protrusion 48 may comprise a crest 49 arranged at a distance D2 from the distal guide tip 46, which distance D2 may be smaller than the distance D1 at which the guide lip notch 45 is arranged from the distal guide tip 46. Thus, the locking protrusion 48 may assist in determining the locking position in the longitudinal direction P2 of the cross runner 30. According to an alternative embodiment, the distance D2 may essentially correspond to the distance D1 thereby ensuring that the engagement between the locking protrusion and the engagement edge is maintained once the cross runner connector has been fully inserted and has slid in the second lateral direction.

As mentioned above, the cross runner connector 40 slides in the second lateral direction P4 in response to the engagement between the locking protrusion 48 and the first engagement edge 13. The sliding stops as at least one of the guiding lip and 41 the locking lip 42 of the cross runner connector 40 abuts a first lateral edge 19 of the opening 11. The opening 11 also comprises an opposing second lateral edge 20 with which the cross runner connector 40 may cooperate if it was to be inserted into the opening 11 from the opposite lateral side of the main runner 10. Thus, the guiding lip 41 and/or the locking lip 42 will in cooperation with the opening 11 determine the locking position in a lateral direction.

The guiding lip 41 and the locking lip 42 will also in cooperation with the opening 11 determine the locking position of the cross runner 40 in the vertical direction.

In the shown embodiment, the cross runner 30 comprises an elevated end flange portion 32. The elevated end flange portion 32 will pass over and overlap the flange 21 of the main runner 10 facing the cross runner 30 as it is connected to the main runner 10. The flange portion of the cross runner 30 adjoining to the elevated end flange portion 32 may thus be at the same level as the flanges 21 of the main runner 10.

The distal edge 33 of the elevated end flange portion 32 may also form part of the insertion stop 50 and assist in defining the locking position in the longitudinal direction of the cross runner 30.

When the cross runner is connected to the main runner, the distal edge 33 of the elevated end flange portion 32 may engage or abut on the web of the main runner, and the extension of the distal edge 33 in the longitudinal direction P1 of the main runner may thus assist in ensuring that the cross runner is connected at a right angle to the main runner.

Figure 5:
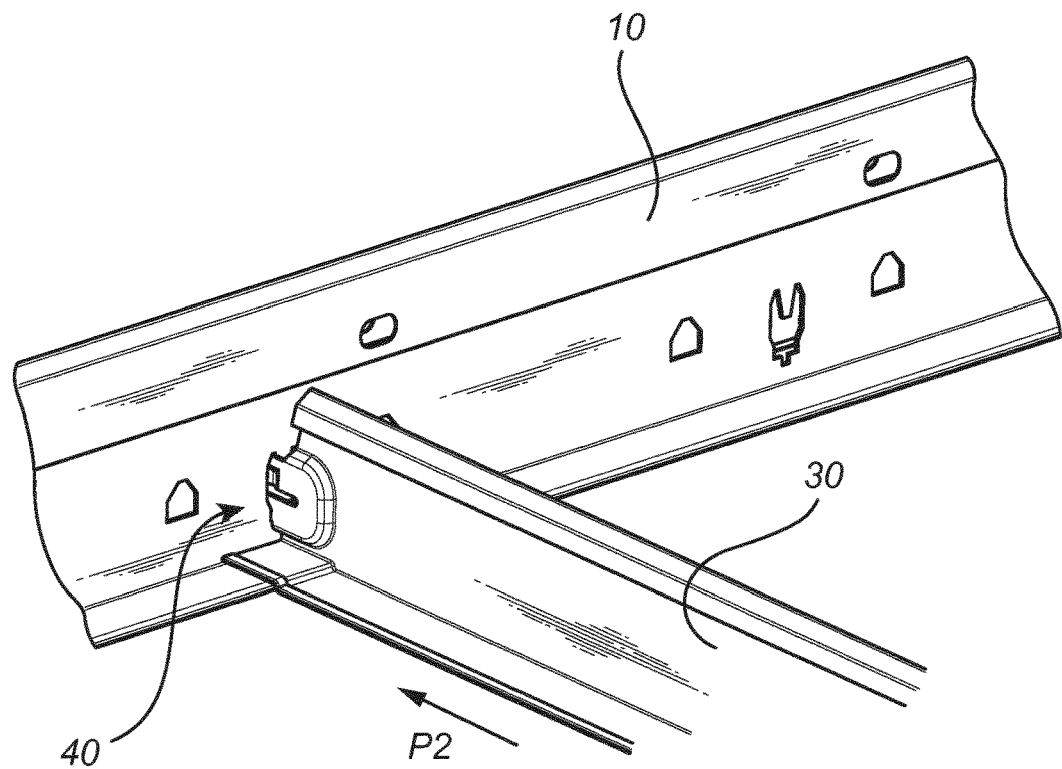
FIG. 5 is a perspective view of the cross runner connected to the main runner from a first lateral side of the main runner.
Figure 6:
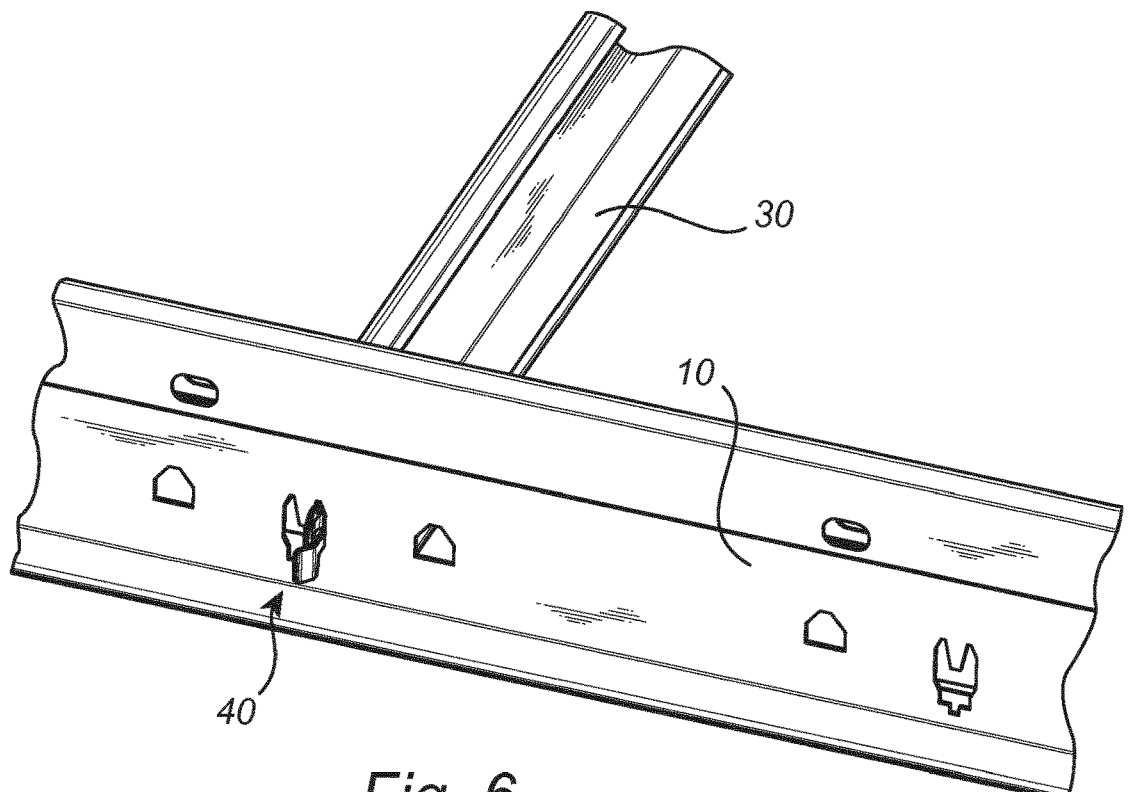
FIG. 6 is a perspective view of the cross runner connected to the main runner from a second lateral side opposite to the first lateral side of the main runner.

FIGS. 5 and 6 illustrate the cross runner 30 connected to the main runner 10 with the cross runner connector 40 fully inserted into the opening 11.

Figure 7:
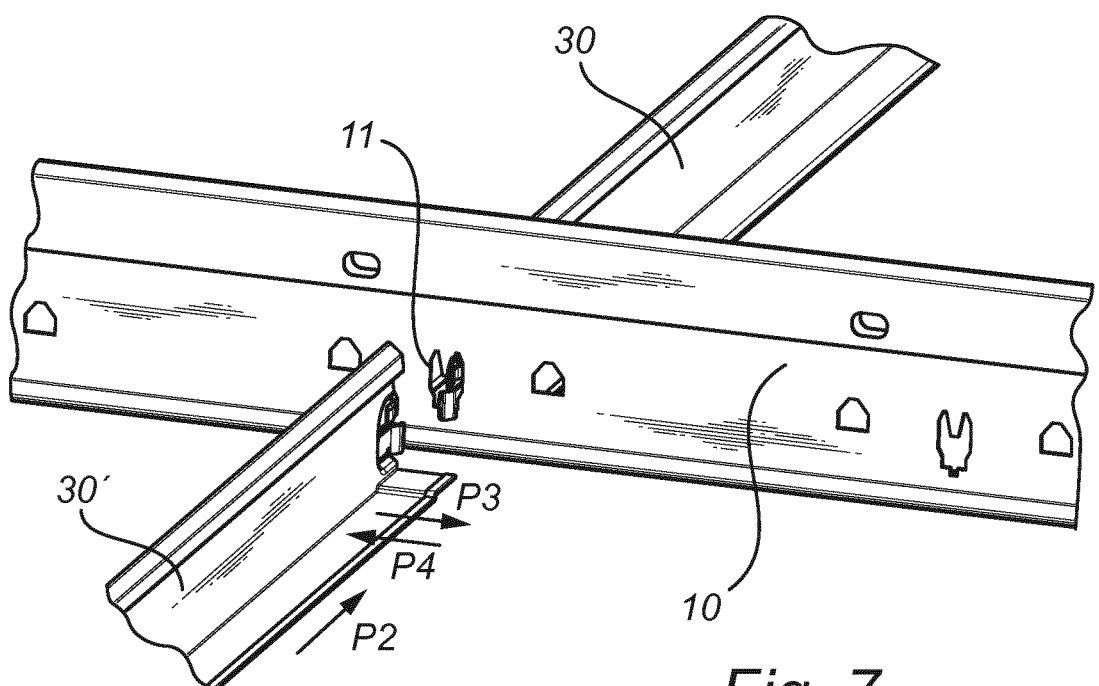
FIGS. 7 and 8 are perspective views illustrating steps of connecting an additional cross runner to a main runner.
Figure 8:
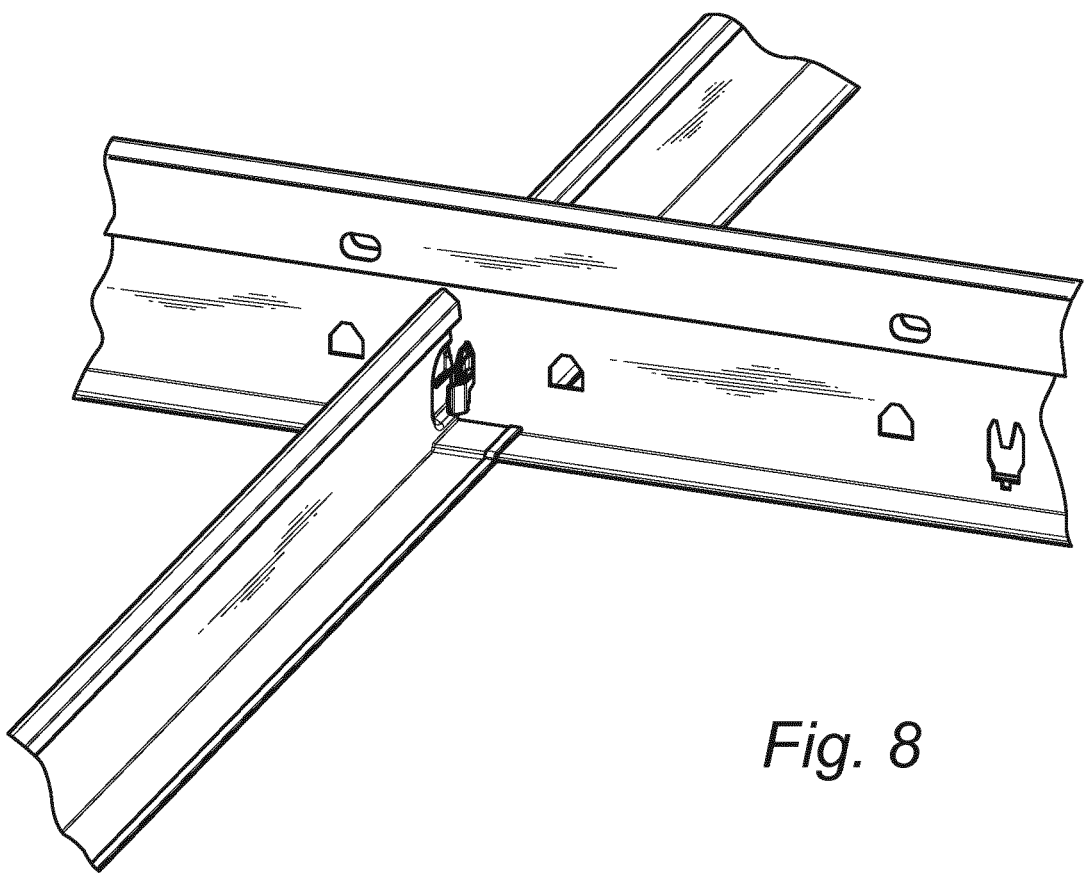

As has been described above, the cross runner 30 will be displaced in the second lateral direction P4 once the cross runner connector 40 has been fully inserted into the opening 11. Hereby, space is provided enabling connection of a second cross runner to the main runner from the opposing side. FIGS. 7 and 8 illustrate the connection of the second cross runner 30' to the main runner 10 and the connection is carried out in accordance with what has been described above with the difference that the second cross runner 30' is initially displaced in the second lateral direction P4 and subsequently in the first lateral direction P3 in response to the locking lip's engagement 42 with the second engagement surface 14 of the opening 11.

In order to disconnect the cross runner connector and the associated cross runner from the main runner, the cross runner connector may be manipulated, for instance by means of finger manipulation of the guiding lip and the locking lip, such that the guide lip notch is once more aligned with the opening notch enabling subsequent retraction of the cross runner connector out of the opening.

However, the cross runner connector and the associated cross runner may alternatively easily be disconnected simply by twisting or turning the cross runner as illustrated in FIG. 9.

Twisting or turning in the direction indicated by arrow P5 of the cross runner 30 will cause the guiding lip 41 to slide in the first lateral direction P3 with the bottom edge 18 of the opening 11 received by the guide lip notch 45 until the opening notch 12 is aligned with the guide lip notch 45. In a next step, the cross runner 30 may be retracted such that the cross runner connector 40 is pulled out of the opening 11.

Thus, the cross runner connector 40 according to this embodiment enables connection of a single cross runner 30 to a main runner 10 as well as connection of two cross runners to a main runner from opposing sides at the same discrete location. Disconnection of the cross runner is easily achieved simply by twisting of the cross runner 30. Since disconnection may be achieved by twisting, the longitudinal extension of the locking lip and the guiding lip may be minimized as there is no need for provision of space for pressing the locking lip by for instance finger manipulation, which in turn enables improved utilization of material.

As mentioned above, the inventive cross runner connector 40 may be provided with a safety notch 52 which in the shown embodiment is arranged in the top edge 53 of the locking lip 42. The purpose of the safety notch 52 is to prevent the cross runner 30 from falling down during connection or disconnection. More specifically, the safety notch 52 is arranged to receive an upper edge 22 of the opening 11 in case a person lets go of the cross runner 30 during connection or disconnection with the cross runner connector 40 partly inserted into the opening 11. As a consequence, the cross runner 30 will be securely left hanging in the main runner 10.

In accordance with an alternative embodiment, the guiding lip 41 and the locking lip 42 of the cross runner connector 30 may switch places as disclosed in FIGS. 10 and 11, and the configuration of the opening 11 in the main runner 10 is then correspondingly modified. Thus, the opening comprises in this case a base portion 15 comprising an upper edge 22 extending in the longitudinal direction P1 of the main runner 10, wherein the opening notch 12 is provided in the upper edge 22 at a central location. The two leg portions 16, 17 extend in a downward direction from the base portion 15, and the first engagement edge 13 is associated with the first leg portion 16 and the second engagement edge 14 is associated with the second leg portion 17.

In the embodiment shown in FIGS. 10 and 11, the guiding lip 41 comprises an end portion 47 which is angled rather than curved relative the remaining part of the guiding lip 41, such that the distal guide tip 46 of the guiding lip 41 becomes offset in the first lateral direction. This configuration of the end portion 47 of the guiding lip 41 may of course be used in other embodiments of the invention.

The connection is performed in manner similar to that described above, i.e. the cross runner connector 40 associated with the cross runner 30 is inserted into the opening 11 of the main runner 10 with the guide edge portion 44 of the guiding lip 41 positioned in the opening notch 12 of the opening 11. The guide edge portion 44 of the guiding lip 41 is formed by a top edge 54 of the guiding lip 41, and the guide lip notch 45 will thus be provided in said top edge 54.

Consequently, the guide lip notch 45 may also act as a safety notch 52 in accordance with what has been described above.

Figure 12:
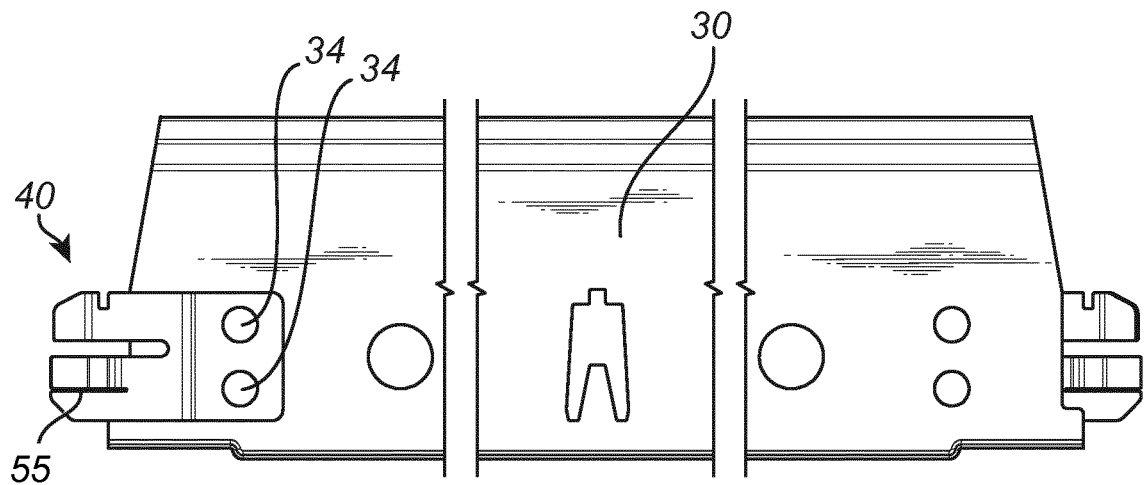
FIG. 12 is a side view of another alternative embodiment of a cross runner connector and associated cross runner.

Further, the cross runner connector 40 has above been described as formed integral with the cross runner 30. It is however understood that the cross runner connector 40 may be formed as a separate member attached to the cross runner 30, in instance by means of rivets 34 as shown in FIG. 12. By forming the cross runner connector as a separate member, the cross runner and the cross runner connector may be made of different materials. As an example, the cross runner connector may be made of spring steel, and in such a case, the locking lip may be provided with an additional longitudinal slit 55 in order to facilitate manufacturing.

Figure 13:
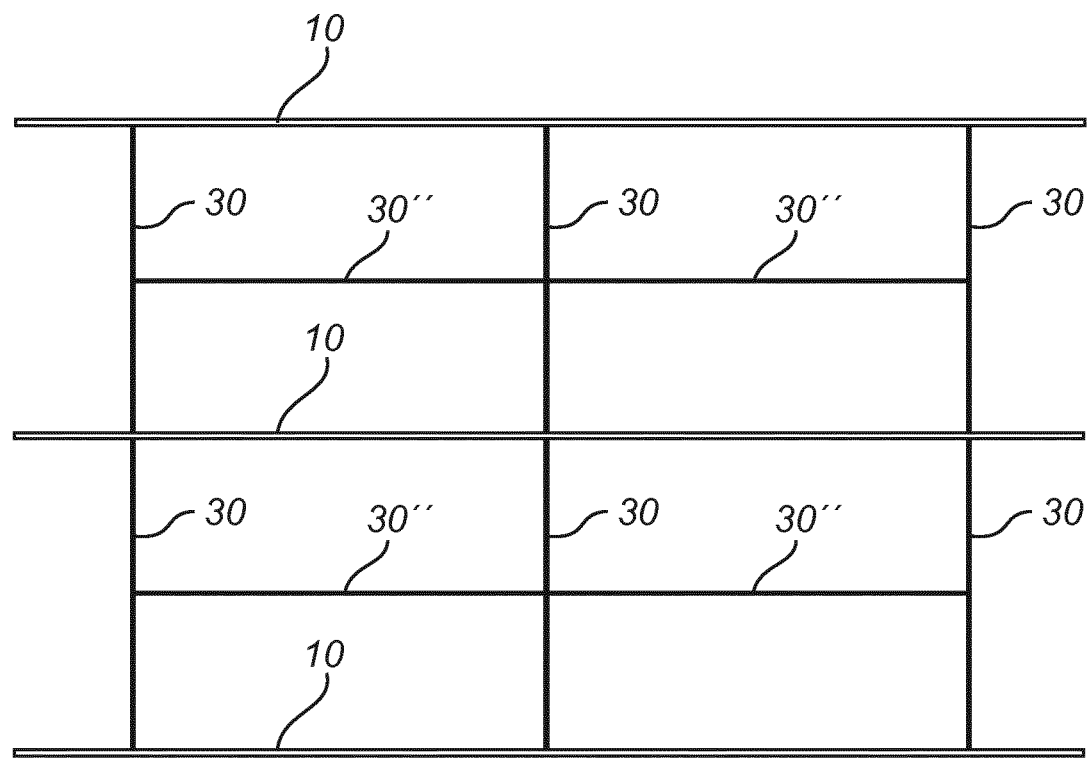
FIG. 13 is a schematic top view of a grid of profiles comprising cross runners connected at right angles to main runners and additional cross runners connected at right angles to the cross runners by means of the cross runner connector arrangements in accordance with the present invention.

It is further realized that an additional cross runner 30" may be connected to a cross runner 30 connected to a main runner 10, as schematically indicated in FIG. 13. The cross runner 30 connected to the main runner 10 will in such a case correspond to a main runner relative to the additional cross runner 30".

It will be appreciated that the present invention is not limited to the embodiments shown. Several modifications and variations are thus conceivable within the scope of the invention which thus is exclusively defined by the appended claims.

The invention claimed is:

1. A cross runner connector for a suspended ceiling system comprising a main runner being provided with an opening for reception of the cross runner connector and having a circumference defining an opening notch; and a cross runner, the cross runner connector comprising:
    a guiding lip and a locking lip separated by a slit and extending in a common plane in the longitudinal direction of the cross runner connector,
    the guiding lip having a guide edge portion provided with a guide lip notch and a distal guide tip being offset in a first lateral direction such that the cross runner connector is laterally displaceable in the first lateral direction in response to insertion of the cross runner connector into the opening of the main runner with the guide edge portion positioned in the opening notch of the opening, and
    the locking lip having a locking protrusion protruding in the first lateral direction.

2. The cross runner connector according to claim 1, wherein the locking lip has a length L1 which is greater than a length L2 of the guiding lip.

3. The cross runner connector according to claim 1, wherein one of the guiding lip and the locking lip comprises an upper safely notch provided in a top edge of the associated lip.

4. The cross runner connector according to claim 1, wherein the cross runner connector is formed integral with a cross runner of the suspended ceiling system.

5. The cross runner connector according to claim 1, wherein the cross runner connector is associated with a cross runner of the suspended ceiling system having an inverted T-shape.

6. The cross runner connector according to claim 1, wherein the slit has a length L3 exceeding a length L1 of the guiding lip and exceeding a length L2 of the locking lip.

7. The cross runner connector according to claim 1, wherein the guide lip notch is arranged at a distance D1, in the longitudinal direction of the cross runner connector, from the distal guide tip and wherein the locking protrusion has a crest arranged at a distance D2, in the longitudinal direction of the cross runner connector, from the distal guide tip, the distance D1 being greater than the distance D2.

8. The cross runner connector according to claim 1, further comprising an insertion stop for defining a locking position in the longitudinal direction of the cross runner connector.

9. The cross runner connector according to claim 8, wherein the insertion stop and the guide lip notch are arranged at a distance D1, in the longitudinal direction of the cross runner connector, from the distal guide tip.

10. A cross runner connector arrangement for a suspended ceiling system, the cross runner connector arrangement comprising:
   a cross runner connector according to claim 1 and associated with a cross runner; and
   a main runner being provided with an opening having a circumference defining an opening notch and a first and a second engagement edge,
   wherein the first engagement edge is arranged for engagement with the cross runner connector when connected to the main runner from a first lateral side thereof,
   wherein the second engagement edge is arranged for engagement with the cross runner connector when connected to the main runner from a second lateral side thereof opposite to said first lateral side, and
   wherein the cross connector is insertable into the opening of the main runner with the guide edge portion positioned in the opening notch for connection of the cross runner to the main runner.

11. The cross runner connector arrangement according to claim 10, in which the locking lip is arranged to engage with one of the first and second engagement edge of the opening in response to an initial insertion of the cross runner connector into the opening of the main runner,
   wherein the locking lip is arranged to flex in a second lateral direction opposite to the first lateral direction in response to a further insertion of the cross runner connector into the opening, and/or
   wherein the guiding lip is arranged to flex in the second lateral direction in response the further insertion of the cross runner connector into the opening.

* * * * *